Patented June 5, 1923.

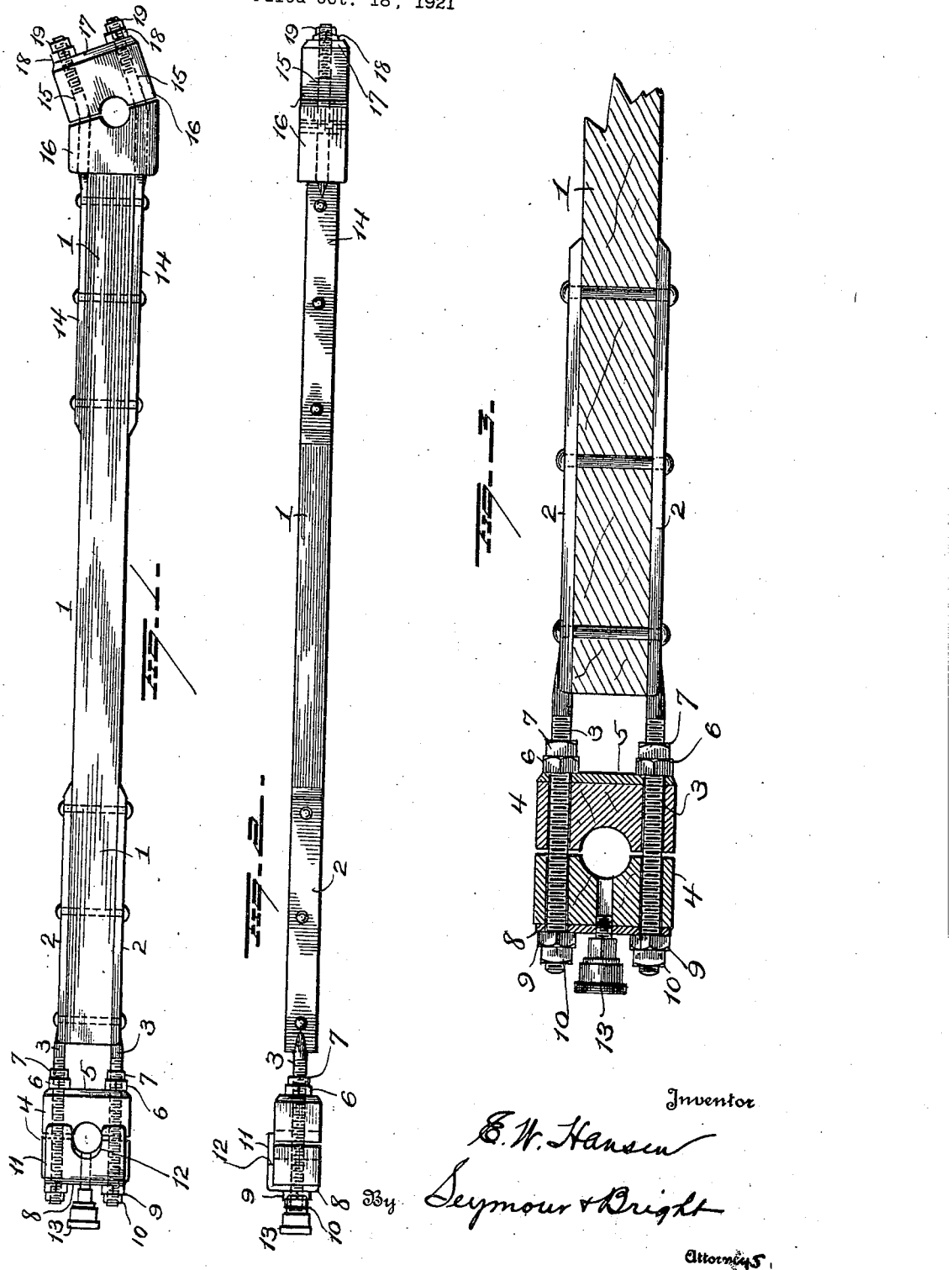

1,457,434

UNITED STATES PATENT OFFICE.

EDWARD WILLIAM HANSEN, OF MINDEN, NEBRASKA.

PITMAN.

Application filed October 18, 1921. Serial No. 508,504.

*To all whom it may concern:*

Be it known that I, EDWARD WILLIAM HANSEN, a citizen of the United States, and a resident of Minden, in the county of Kearney and State of Nebraska, have invented certain new and useful Improvements in Pitmen; and I do hereby declare the following to be a full, clear, and exact description of the invention, such as will enable others skilled in the art to which it appertains to make and use the same.

This invention relates to improvements in pitmen and particularly to such as provide connecting means between driving and driven parts of machinery, as between the sickle of a grain harvester and the driving mechanism for the same, for example,—one object of the invention being to provide a a wooden pitman with simple and efficient means for attaching bearing boxes thereto in such manner that one of said boxes shall be adjustable to provide for adjustment of the effective length of the pitman and thus insure the accurate operation of the driven device.

With this and other objects in view, the invention consists in the parts and combination of parts as hereinafter set forth and pointed out in the claims.

In the accompanying drawings, Figure 1 is a view showing an embodiment of my invention. Figure 2 is a view at right angles to Figure 1, and Figure 3 is a sectional view.

The body portion of the pitman is preferably made of wood and consists of a bar 1 of suitable length. To one end portion of the wooden body 1, metal straps or plates 2—2 are secured by means of bolts or rivets passing through the same and through the wooden body. The straps or plates 2 are located diametrically opposite each other and are provided with threaded shanks or arms 3—3 which project beyond the end of the wooden body 1. The threaded arms 3 pass freely through the members of a bearing box 4 and, against one of said bearing box members, a plate 5 is located and provided with suitable holes for the passage of the threaded arms. Nuts 6 are threaded on said arms and bear against the plate 5 and jam nuts 7 on said arms are caused to bear against the nuts 6. A plate 8 is located on the arms against the other member of the bearing box and provided with suitable holes for the passage of the threaded arms, and on the free end portions of said arms nuts 9 and jam nuts 10 are located. The plate 8 is made with a flange 11 which overlies the bearing box and is provided with a notch or recess 12 in line with the opening of the bearing box, said notched flange serving to reinforce the bearing box and also to prevent undue wear of the same. The plate 8 supports a lubricator 13 and this lubricator projects through one member of the bearing box for supplying lubricant within the latter.

It will be apparent that by loosening the several nuts on the respective threaded arms, the bearing box may be adjusted relatively to one end of the pitman and the nuts then tightened,—thus providing for adjustment of the effective length of the pitman and insuring its accurate operation in driving the device with which the other end of the pitman is connected. At the said other end of the pitman body, straps or plates 14 are secured thereto so as to be disposed diametrically opposite each other and said straps or plates are provided with threaded arms 15 which extend beyond the end of the pitman body 1 and pass through holes in the members of a bearing box 16. The pitman shown in the drawing is intended for connection with the sickle of a harvester and as the bearing box 16 is intended to work in the slot where the sickle head slides, it is necessary that said bearing box may have what is in effect, a bend. The threaded arms 15 are therefore bent laterally after passing through one member of the bearing box so that the other member of said bearing box will be disposed at an angle to the first mentioned member. A plate 17 is located against the outer bearing box member and provided with holes through which the threaded arms 15 pass and on said threaded arms nuts 18 and jam nuts 19 are located.

Having fully described my invention what I claim as new and desire to secure by Letters-Patent, is:

1. In a pitman, the combination with a body member, diametrically opposite plates secured to one end portion of said body member and provided with threaded arms projecting beyond the latter, a bearing box through which said threaded arms pass freely, plates fitted upon said arms against the opposite sides of the bearing box and bridging the arms, nuts on said threaded arms bearing against said plates at respective sides of the bearing box, whereby said bearing box may be adjusted to adjust the effective length of the pitman, and a bearing box at the other end of said pitman.

2. In a pitman, the combination with a body member, of plates secured thereto near one end thereof and provided with threaded arms projecting beyond said body member, a bearing box movably mounted on said arms, plates mounted on said arms and bearing against the respective members of the bearing box, one of said plates having a flange provided with a notch aligning with the opening of the bearing box, and nuts on said threaded arms for holding the bearing box in adjusted position.

3. In a pitman, the combination with a body member, plates secured to said body member and provided with threaded arms projecting beyond the latter at both ends thereof, bearing boxes mounted on the threaded arms, the threaded arms at one end of the pitman having laterally projecting portions whereby one member of the bearing box thereon will be disposed at an angle to the other member thereof.

In testimony whereof, I have signed this specification in the presence of two subscribing witnesses.

EDWARD WILLIAM HANSEN.

Witnesses:
J. H. JENSEN,
CARL F. FAVINGER.